Dec. 11, 1934.    J. HAAS    1,983,607
IDENTIFICATION TAG
Filed April 19, 1933
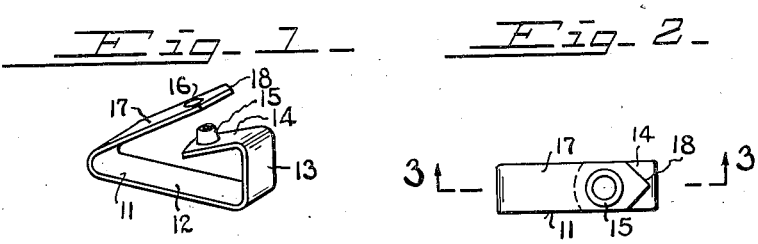
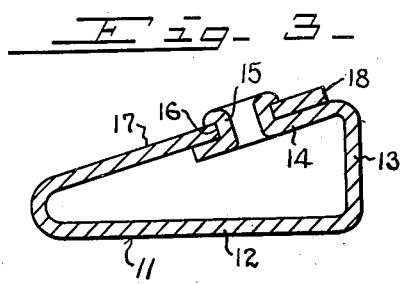
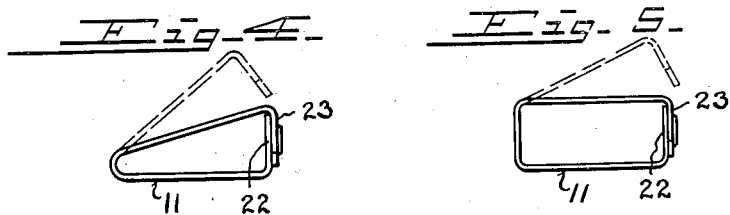
INVENTOR.
JOSEPH HAAS.
BY H.C. Karel.
ATTORNEY.

Patented Dec. 11, 1934

1,983,607

UNITED STATES PATENT OFFICE 1,983,607

IDENTIFICATION TAG

Joseph Haas, Newport, Ky.

Application April 19, 1933, Serial No. 666,877

2 Claims. (Cl. 40—3)

This invention relates to an improved tag which is adapted to be attached to the wing of the fowl or applied to the ear of an animal by forcing the pointed end of the tag through the wing or ear and then bringing the two ends of the tag together in overlapping relation and sealing said ends together. This invention is an improvement upon the tag shown and described in a patent issued to me February 9, 1932, No. 1,844,359. I have found that the projecting ends shown in my previous patent occasionally caught between the wing and the body of the baby chick, causing injury to the bird. In my improved band I have brought the ends of the band into overlapping relation whereby any shifting of the band in the wing will not cause injury to the bird, but will present a flat face against the body.

It is the object of my invention to provide a band having a plurality of flat faces so arranged to act as braces for each other to prevent crushing of the band or injury to the bird or animal.

A further object is to provide such a band with a pointed end for easy attachment to the wing of the fowl or ear of an animal.

My invention will be further readily understood from the following description and claims, and from the drawing, in which latter:

Fig. 1 is a perspective view of my improved tag in open relation.

Fig. 2 is a plan view of the same with the ends riveted together.

Fig. 3 is a cross-section of the same, taken on the line 3—3 of Fig. 2; and,

Figs. 4 and 5 are side views of modified tags.

My improved band comprises a strip of comparatively soft metal 11, which is bent to form a plurality of sides comprising a base portion 12, a spacing portion 13 having an inwardly extending rivet support 14, in which a suitable rivet 15 is formed or pressed out of the material for cooperating with an opening 16 in the upper member 17. This upper member 17 is provided with a pointed end 18 for insertion in the wing of the fowl or the ear of an animal.

While I have shown an open topped integral rivet, any suitable rivet or clinching means may be employed to secure the ends of the band together, without departing from the scope of my invention.

In the banding of baby chicks, which is usually done when the chicks are a few days old and the wings are comparatively tender, the pointed end is inserted in the web of the wing and the band then clinched without the aid of additional piercing tools.

In the modification shown in Figs. 4 and 5, the band 11 has the rivet secured to the upwardly extending portion 22, and the opening for receiving the rivet is in the downwardly extending portion 23.

In applying the tag to the wing of the fowl, the pointed end of the tag is forced through the inner web which joins the arm and forearm of the wing. The respective ends of the band are then pressed together, causing the rivet 15 to enter the opening 16, and the rivet is then clinched by any suitable clinching tool for sealing the tag. The construction of the band is such as to permit a maximum amount of space for suitable letters or identification numbers and is arranged to form cooperating bracing faces for preventing the band from being easily pressed out of shape. Tags of this character are quite small and are made out of flexible metal which is easily bent, but by forming the band with cooperating bracing faces, bending or distortion of the band is prevented.

Having thus fully described my invention, what I claim as new, and desire to secure by Letters Patent, is:

1. In an identification tag, the combination of a metallic band bent to form a plurality of flat faces in bracing relation with a pair of said faces forming a right angle and the ends of said band overlapping and being provided with cooperating rivet means adjacent to the ends of said band for permanently sealing said band.

2. In an identification tag, the combination of a metallic band bent to form a plurality of flat faces in bracing relation with a pair of said faces forming a right angle and the ends of said band overlapping with one of said ends pointed and one of said ends provided with an integral stud and the other with a cooperating opening for permanently sealing said band.

JOSEPH HAAS.